United States Patent
Metcalf et al.

(10) Patent No.: US 6,792,334 B2
(45) Date of Patent: Sep. 14, 2004

(54) VENDING MACHINE FOR VENDING AGE-RESTRICTED PRODUCTS USING AN AUTHORIZATION CARD AND ASSOCIATED METHODS

(75) Inventors: Jonathan H. Metcalf, Houston, TX (US); Merlyn W. Barth, St. Louis, MO (US)

(73) Assignee: Chesterfield Holdings, LLC, Seattle, WA (US)

( * ) Notice: Subject to any disclaimer, the term of this patent is extended or adjusted under 35 U.S.C. 154(b) by 255 days.

(21) Appl. No.: 09/836,805

(22) Filed: Apr. 17, 2001

(65) Prior Publication Data

US 2001/0047223 A1 Nov. 29, 2001

Related U.S. Application Data

(60) Provisional application No. 60/198,349, filed on Apr. 18, 2000.

(51) Int. Cl.[7] .............................................. G06F 17/00
(52) U.S. Cl. ...................... 700/237; 235/379; 700/244; 700/242
(58) Field of Search ...................... 705/41, 26; 700/237; 239/379

(56) References Cited

U.S. PATENT DOCUMENTS

| | | | | |
|---|---|---|---|---|
| 3,740,530 A | * | 6/1973 | Hoffer et al. ............... | 235/61.7 |
| 3,896,266 A | * | 7/1975 | Waterbury ...................... | 179/1 |
| 4,230,214 A | | 10/1980 | Cortez .......................... | 194/59 |
| 4,650,977 A | | 3/1987 | Couch .......................... | 235/379 |
| 4,709,136 A | * | 11/1987 | Watanabe ...................... | 235/379 |
| 4,882,779 A | * | 11/1989 | Rahtgen ........................ | 380/24 |
| 4,884,212 A | | 11/1989 | Stutsman ...................... | 364/479 |
| 4,915,205 A | | 4/1990 | Reid et al. .................... | 194/205 |
| 4,982,072 A | | 1/1991 | Takigami ...................... | 235/384 |
| 4,995,081 A | | 2/1991 | Leighton et al. .............. | 380/23 |
| 5,042,686 A | | 8/1991 | Stucki ........................... | 221/13 |
| 5,091,713 A | | 2/1992 | Horne et al. ................. | 340/541 |
| 5,139,384 A | | 8/1992 | Tuttobene .................... | 414/281 |
| 5,146,067 A | | 9/1992 | Sloan et al. ................. | 235/381 |
| 5,147,021 A | | 9/1992 | Maruyama et al. ......... | 194/217 |
| 5,193,114 A | * | 3/1993 | Moseley ........................ | 380/23 |
| 5,273,183 A | | 12/1993 | Tuttobene ...................... | 221/7 |
| 5,352,876 A | * | 10/1994 | Watanabe et al. ........... | 235/381 |
| 5,371,346 A | | 12/1994 | Menoud ...................... | 235/381 |
| 5,450,980 A | | 9/1995 | Laidlaw ........................ | 221/1 |
| 5,523,551 A | | 6/1996 | Scott ........................... | 235/381 |

(List continued on next page.)

FOREIGN PATENT DOCUMENTS

| | | | | |
|---|---|---|---|---|
| JP | 6 236477 | | 2/1993 | |
| JP | 8 241455 | | 3/1995 | |
| WO | WO 97/22092 | * | 6/1997 | ............. G07F/7/10 |
| WO | WO98/04969 | * | 2/1998 | ............. G06F/7/08 |
| WO | WO 99/09508 | | 2/1999 | |

OTHER PUBLICATIONS

International Search Report for PCT Application No. PCT/US01/12600 (previously cited in Supplemental IDS communication to the PTO, dated Aug. 27, 2001) dated Aug. 8, 2001.

International Search Report for PCT Application No. PCT/US01/40694 dated Oct. 30, 2001.

*Primary Examiner*—Donald P. Walsh
*Assistant Examiner*—Michael E. Butler
(74) *Attorney, Agent, or Firm*—Howrey Simon Arnold & White LLP

(57) ABSTRACT

A method and system for verifying the age of a purchaser prior to his purchase of age-restricted items from a vending machine. An authorization card is issued to a customer containing a password when the customer presents identification material identifying the customer as being of at least a predetermined age. The customer inputs the authorization card into the vending machine, and a comparison of the password on the card is made to the password stored in a microprocessor in the vending machine. If the passwords match, the vending machine is enabled to accept payment from the customer and to vend the age-restricted product.

22 Claims, 3 Drawing Sheets

U.S. PATENT DOCUMENTS

| | | | |
|---|---|---|---|
| 5,553,119 A | 9/1996 | McAllister et al. | 379/67 |
| 5,553,155 A * | 9/1996 | Kuhns et al. | 382/115 |
| 5,559,885 A * | 9/1996 | Drexler et al. | 380/23 |
| 5,586,171 A | 12/1996 | McAllister et al. | 379/67 |
| 5,641,050 A | 6/1997 | Smith et al. | 194/210 |
| 5,641,092 A | 6/1997 | Scott | 221/134 |
| 5,647,505 A | 7/1997 | Scott | 221/2 |
| 5,696,908 A | 12/1997 | Muehlberger et al. | 395/239 |
| 5,722,526 A | 3/1998 | Sharrard | 194/346 |
| 5,734,150 A | 3/1998 | Brown et al. | 235/381 |
| 5,774,365 A | 6/1998 | Ladue et al. | 364/479.07 |
| 5,819,981 A | 10/1998 | Cox | 221/2 |
| 5,859,779 A | 1/1999 | Giordano et al. | 364/479.01 |
| 5,927,544 A * | 7/1999 | Kanoh et al. | 221/96 |
| 5,988,346 A | 11/1999 | Tedesco et al. | 194/217 |
| 6,052,629 A | 4/2000 | Leatherman et al. | 700/241 |
| 6,072,902 A | 6/2000 | Myers | 382/167 |
| 6,078,902 A | 6/2000 | Schenkler | 705/35 |
| 6,085,976 A | 7/2000 | Sehr | 235/384 |
| 6,109,524 A | 8/2000 | Kanoh et al. | 235/381 |
| 6,119,932 A * | 9/2000 | Maloney et al. | 235/380 |
| 6,339,762 B1 * | 1/2002 | Powell | 705/14 |
| 6,507,823 B1 * | 1/2003 | Nel | 705/26 |
| 6,554,188 B1 * | 4/2003 | Johnson et al. | 235/385 |

* cited by examiner

VENDING MACHINE FOR VENDING AGE-RESTRICTED PRODUCTS USING AN AUTHORIZATION CARD AND ASSOCIATED METHODS

CROSS-REFERENCE TO RELATED APPLICATION

This application claims priority under 35 U.S.C. §119(e) to provisional patent application Ser. No. 60/198,349, entitled "Method and System of Age Verification For a Vending Machine," filed on Apr. 18, 2000.

BACKGROUND OF THE INVENTION

The present invention relates generally to a vending machine for vending age-restricted products using an authorization card and associated methods.

Most, if not all, states impose minimum age requirements for the purchase of certain products such as alcohol, tobacco products, and other age-restricted products. In order to purchase such products, the customer traditionally must present identification to the seller to verify his or her age prior to the transaction. The inability to verify the customer's age prevents age-restricted products from being sold in vending machines. This verification process is particularly problematic in the vending machine industry since vending machines, by their very nature, involve unattended point-of-purchase transactions. Some examples of prior approaches to this problem or related problems can be found in the following U.S. patents, all of which are incorporated herein by reference in their entirety: U.S. Pat. Nos. 4,884,212; 5,139,384; 5,146,067; 5,273,183; 5,352,876; 5,371,346; 5,450,980; 5,523,551; 5,641,050; 5,641,092; 5,647,505; 5,696,908; 5,722,526; 5,734,150; 5,774,365; 5,819,981; 5,859,779; 5,927,544; 5,988,346; 5,147,021; 4,982,072; 4,915,205; and 4,230,214.

In U.S. Pat. No. 5,722,526, issued to Sharrard, a vending machine system for age-restricted products is disclosed. In the Sharrard system, a customer inputs money into the vending machine and makes his or her selection. Thereafter, the customer is prompted to input an identification card such as a state government issued identification card or a drivers license containing the customer's birth date. The vending machine either optically reads and interprets the written birth date on the face of the card, or reads the birth date data from a magnetic strip contained on the back of the card. A processor unit compares this data with the present date that is keyed into the vending machine by its operator, and determines whether the customer is of a sufficient age to purchase the product.

However, common forms of identification often do not have data written or encoded on them indicative of the user's age or birth date. Moreover, some forms of identification may not have magnetic strips, such as drivers licenses which may or may not have a magnetic strip depending on the state at issue. Finally, it is not a simple matter to optically read and interpret written birth date data, a process that involves complicated scanning and data-interpretation technology. It would therefore be advantageous to have a vending machine capable of vending age-restricted products that did not suffer from the drawbacks of the Sharrard vending machine or other vending machines of the prior art.

SUMMARY OF THE INVENTION

The invention meets the above needs and overcomes the deficiencies of the prior art by providing an economically feasible and commercially practical method and system for verifying the age of a purchaser prior to his purchase of age-restricted items from a vending machine.

An aspect of the invention includes issuing an authorization card to a customer containing a password when the customer presents identification material identifying the customer as being of at least a predetermined age. The customer inputs the authorization card into the vending machine, and a comparison of the password on the card is made to the password stored in a microprocessor in the vending machine. If the passwords match, the vending machine is enabled to accept payment from the customer and to vend the age-restricted product. In a further aspect of the invention, the authorization card contains additional data concerning the customer. The customer is prompted by the vending machine to enter a second card, such as a credit card. The microprocessor in the vending machine compares the additional data on the authorization card to the information on the second card to further verify the propriety of the purchase.

DESCRIPTION OF PREFERRED EMBODIMENTS

In the disclosure that follows, in the interest of clarity, not all features of actual implementations are described. It will of course be appreciated that in the development of any such actual implementation, as in any such project, numerous engineering and design decisions must be made to achieve the developers' specific goals and subgoals (e.g., compliance with mechanical- and business-related constraints), which will vary from one implementation to another. Moreover, attention will necessarily be paid to proper engineering and design practices for the environment in question. It will be appreciated that such a development effort might be complex and time-consuming, but would nevertheless be a routine undertaking for those of skill in the art.

The present invention contemplates that a customer desiring to purchase an age-restricted item from the disclosed vending machine first obtain an authorization card containing a password to enable the purchase. This process is advantageous over the prior art in that the issued authorization card is specifically designed to work with the vending machines in question.

Figure 1:
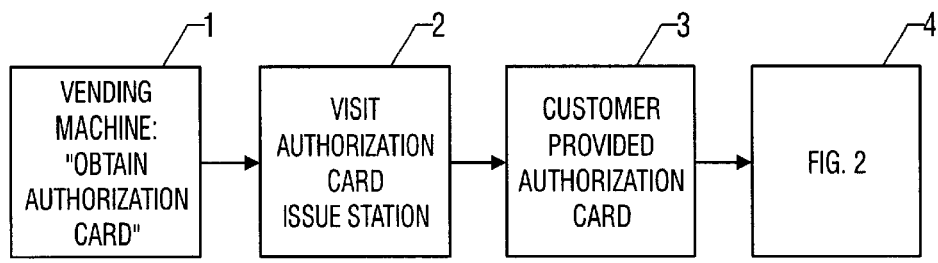
FIG. 1 is a block diagram illustrating the process that a user must go through to obtain an authorization card useful with the disclosed vending machine.

FIG. 1 illustrates the basic steps that that a customer must go through to obtain an authorization card useful with the disclosed vending machine. Beginning at step 1, a display associated with the vending machine instructs the customer to obtain the authorization card at an issue station. Preferably, the issue station is located in the vicinity of the vending machine and is attended by an operator, e.g., a customer service agent working at a store's customer service counter. At step 2, the customer visits the issue station and the issue station operator verifies the customer's age, for example, by reviewing the customer's drivers license or other recognized form of identification accurately setting forth the customer's age. Upon verification of the customer's age, the operator provides the customer the authorization card at step 3. The customer can then return to the vending machine to use the authorization card to make a purchase, the process of which is described later with reference to FIG. 2.

While many different types of authorization cards could be used by the vending machine to effect an age-restricted purchase, two types of authorization cards are preferred depending on the level of security desired under the circumstances. A "Type 1" authorization card contains a password, preferably stored on an industry-standard card having a magnetic strip. However, the authorization card may also be a "smart card" which stores the password in the integrated circuits that are contained within, or may simply be a paper or plastic card on which the password is written. The password may constitute a random number or alpha-numeric string, or it may correspond to a particular vending machine's product name, manufacturer, or part number. This password may be written or programmed into the card by the issue station operator, or the cards may come pre-written or pre-programmed from the authorization card manufacturers, in which case the issue station operators needs only to hand them out to the customers upon verifying their age. In a preferred embodiment, an issue station operator has a card encoding/printing machine at his disposable which can allow him to program an authorization card having a magnetic strip with a password acceptable to a vending machine or machines in locations close to the issue station, or to all vending machines of a certain type, wherever located. While many types of authorization card and card programming machines might be used in a commercial embodiment, the following magnetic-strip cards and programming equipment are presently preferred: RenCode™, Part No. MSR206 (Hi-Co Magstripe Card Reader/Writer) manufactured by Incode, 12142 Severn Way, Riverside, Calif., 92503; Part No. CR80.030/4C/1C (Lam Mag) (programmable cards) manufactured by Plastag Corporation, 1800 Greenleaf, Elk Grove Village, Ill., 60007.

A more secure "Type 2" authorization card preferably encodes additional information (e.g., a credit card number, drivers license number, name, and/or address), which can be used to further safeguard the age verification process during vending, as will be explained later.

Figure 2:
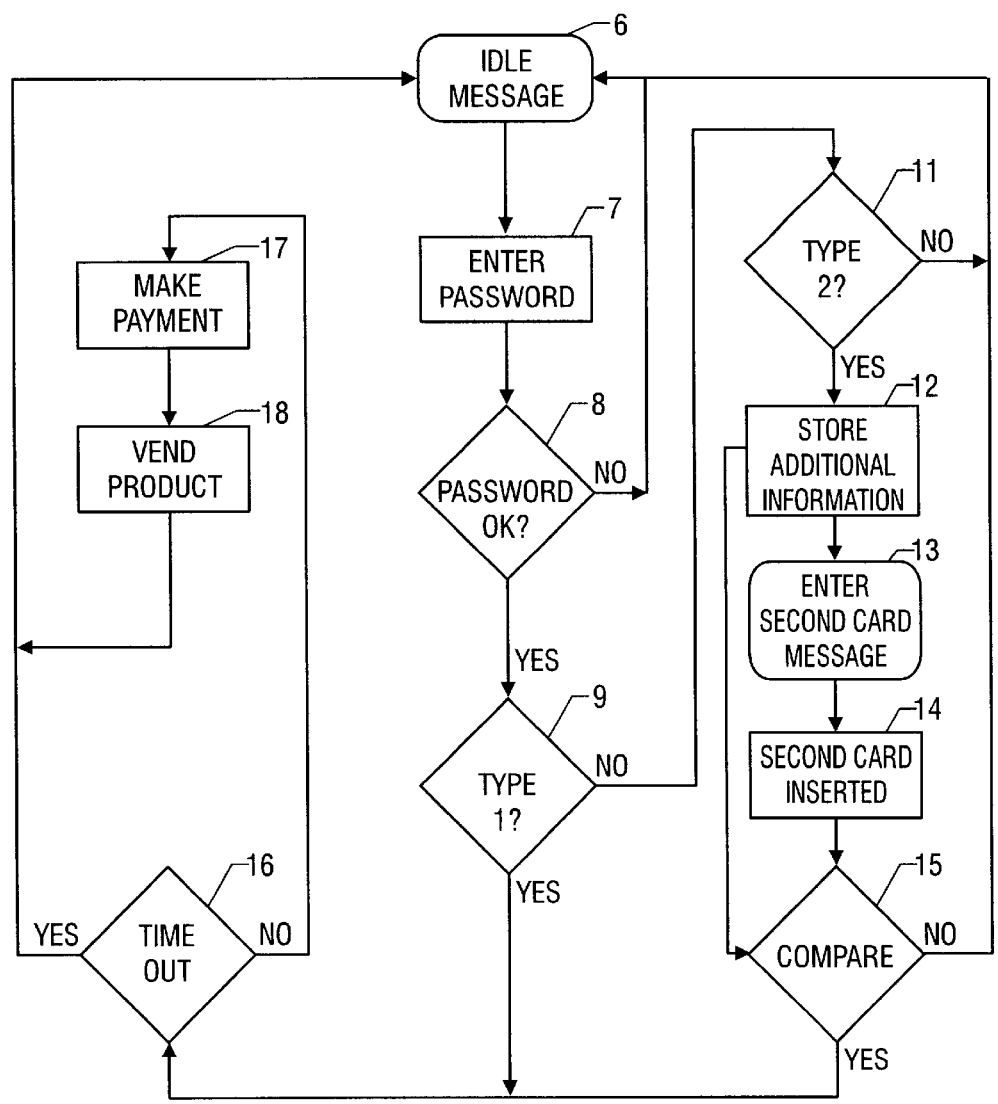
FIG. 2 is a flow diagram illustrating the steps involved in purchasing an age-restricted item from the disclosed vending machine.

Usage of the authorization card to make an age-restricted purchase from a vending machine is shown with reference to FIG. 2. Upon approaching the vending machine, the user is presented with a display (such as a liquid crystal display, a cathode ray tube, other suitable alpha numeric display, or indicator lights) containing an idle message (step 6) which instructs the customer on how to procure an authorization card and/or how to use that card to vend a purchase from the machine. For example, the screen display message prompts the customer to insert the authorization card into an appropriate reader or input device on the vending machine, or otherwise enter the password into the vending machine. For example, if the authorizing card uses a magnetic strip to store information, the customer will "swipe" the card through a credit card reader. In an alternative embodiment, the input device can constitute a key pad for manually entering the password that is printed on the authorization card. Of course, the manual entry of data on the card is not necessary if the card is to be read by a card reader.

Referring again to FIG. 2, the customer follows the instructions on the display and enters the card (or the information printed on the card) at step 7. In a preferred embodiment, the password is compared at step 8 with the password or passwords that are stored in a microprocessor in the vending machine. For example, if the authorization card contains the password "665," the microprocessor will compare that password with the stored password to authorize the transaction. In this regard, it is important that the password issued by the issue station operator matches a password that is stored in the microprocessor. Otherwise, the microprocessor or other logic circuitry connected thereto will need to be periodically updated to match the issued passwords, a step that may be suitable in some applications necessitating a higher degree of security.

Thereafter, at step 9, the data on the authorization card is examined to determine if the authorization card is a Type 1 card. This determination can be made, for example, by checking to see if the authorization card contains only the minimum data that the vending machine needs to verify age. In other words, if other data is detected by the microprocessor, such as a credit card number, drivers license number, name, and/or address, the authorization card will not be treated as a Type 1 card. Alternatively, a "flag," such as a control bit or byte, recognizable by the microprocessor can be stored on the card which indicates whether the card is of a Type 1 or Type 2 type. One skilled in the art will recognize that similar schemes can be used to make the "Type 1" determination of step 9.

If the authorization card is not a Type 1 card, the microprocessor logic determines at step 11 if the card is a Type 2 card. This determination can be made employing the same techniques used in the Type 1 determination of step 9. If the card is Type 2, the microprocessor stores the additional information on the Type 2 card (such as a credit card number, debit card number, drivers license number, social security number, name, address and/or phone number) in a temporary location either on the microprocessor or in memory circuitry connected to it. At that point, the system then at step 13 prompts the customer, preferably by the display, to insert or "swipe" a second card (step 14), such as a credit card, debit card, drivers license, or other readable identification card containing information corresponding to the additional information on the Type 2 card. This information from the second card is then compared at step 15 with the stored additional information on the Type 2 card to further verify the identity of the person to whom the authorization card was issued. Through the use of this extra step, the age-verification process becomes more secure than with a Type 1 card, which in the hands of a minor could otherwise be used to make a purchase that otherwise is not permitted. Of course, with the Type 2 card process, the additional information stored on the card should be made to correspond to the information stored on the contemplated second card (e.g., a credit card) so that a proper comparison may be made at step 15. In a preferred embodiment, the Type 2 card would include a magnetic credit card strip containing a password and the user's credit card number. The microprocessor in the vending machine would then be configured to read the same. While the password may come preprogrammed on the authorization card, the user credit card number would most likely need to be programmed into the card by the issue station operator using the equipment noted earlier.

One skilled in the art will also recognize that password verification (at step 8) could occur after the determination of whether a card is Type 1 (step 9) or Type 2 (step 11) card. Additionally, with a Type 2 card, password verification (step 8) could occur after the comparison of the additional information to the second card (step 15).

In a preferred embodiment, the microprocessor includes a timer for determining the passage of a time-out period (e.g., 20 seconds) at step 16, such that if the customer does not complete a purchase transaction within a predetermined period of time, the system will revert to the idle message at step 6. Assuming the transaction proceeds with due speed, the customer is prompted to enter payment at step 17, such as by cash, debit card, or credit card. (If a Type 2 card requiring credit card validation is contemplated, the credit card information stored at step 12 may be used for payment at step 17, perhaps rendering step 17 unnecessary). The age-restricted product is then distributed from the vending machine at step 18.

Figure 3:
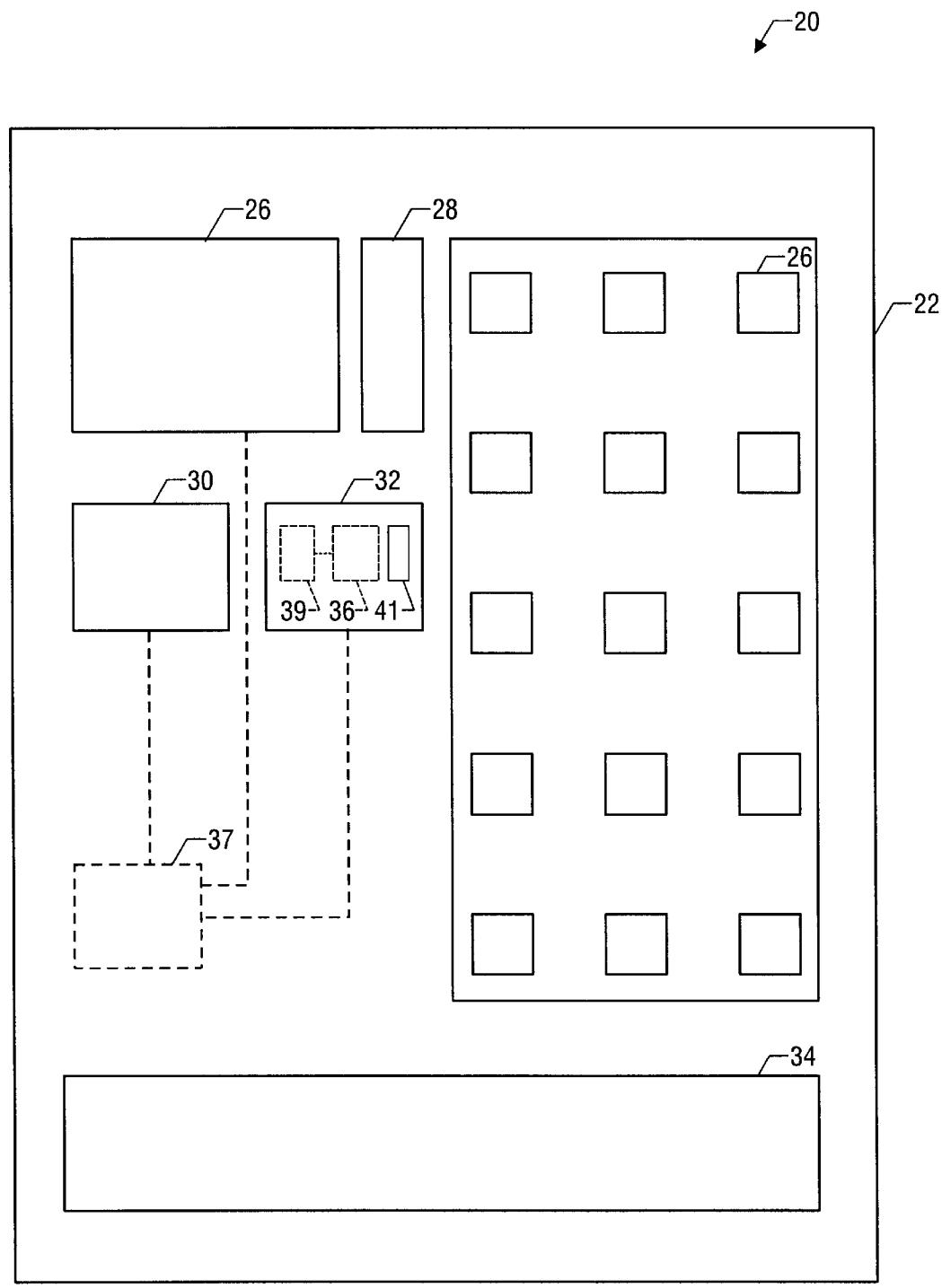
FIG. 3 is a block diagram of a vending machine capable of performing the vending of age-restricted products in accordance with the steps outlined in FIG. 2.

An embodiment of a vending machine capable of operating in the manner described herein is disclosed with reference to FIG. 3. The vending machine 20 includes a product viewing area 22 for displaying age-restricted products 24 to be vended, a display 26, a money-input device 28 capable of receiving change or bills to pay for the purchase, an input device 30 such as a key pad, and a card reader 32 for reading the authorization card, and a door 34 for received the vended product. The key pad 30 can be used to type in password or other age-verification information from a printed authorization card. A separate key pad (not shown) may then be used to select one of the products 24 to be vended, as is typical in the vending machines of the prior art.

Also included in the vending machine 20 is a microprocessor 36 which assists in the verification procedures associated with the Type 1 and Type 2 authorization cards. In a preferred embodiment, the microprocessor is located within the card reader 32. In such a configuration, a pre-existing vending machine otherwise having the necessary components can be retrofitted to work in accordance with the invention by simply adding the card reader 32 and electrically connecting it as will be explained later. The microprocessor 36 is preferably coupled to memory 39 for storing the password(s) associated with the vending machine and/or the additional information read from the Type 2 card. In a commercial embodiment, memory 39 constitutes static random access memory that is backed up by a battery (not shown) to retain the password(s) in the event that vending machine 20 is unplugged.

Memory 39 is not strictly necessary, and instead the necessary password or other information could be stored directly into microprocessor 36 depending on its capacity. As used herein, "microprocessor" should be construed to encompass any logic circuitry and/or memory circuitry capable of performing the logical functions described herein. As the logic functions are fairly simple for a skilled computer programmer to realize, it is contemplated that the microprocessor may be relatively simple, such as a microcontroller, a programmable logic array (PLA), or a collection of logic circuits. However, a Motorola microcontroller part no. MC68HC 11 is presently preferred for microprocessor 36.

When installing or updating the machine, the password(s) to be stored in memory 39 may be loaded by the installer through edge connector 41. Edge connector 41 allows the installer to plug in a portable key pad (not shown) for this purpose.

In the preferred embodiment, vending machine 20 (prior to being retrofitted with the card reader 32) also has its own microprocessor 37, which hereinafter will be referred to as central processing unit (CPU) 37, so as not to confuse it with microprocessor 36 as just described. As one skilled in the art will realize, CPU 37 provides the control logic for the basic functioning on vending machine 20, such as ensuring the proper amount of money has been entered by the customer to make a desired purchase and enabling the vending of products, running display 26, and interfacing with key pad 30 which may be used by the customer to make his selection. In a preferred embodiment, microprocessor 36 and CPU 37 communicate via an asynchronous serial protocol, such as the International Multi Drop Bus (IMDB) protocol.

One skilled in the art should realize that many different arrangements of the disclosed components are possible in a commercial embodiment of vending machine 20. While it has been found preferably to retrofit a pre-existing vending machine, a vending machine could be designed in the first instance to accomplish the same functions disclosed herein. For example, the microprocessor 36 (and its associated memory 39) need not strictly appear within card reader 32, but instead may reside elsewhere in the vending machine 20. Also, the functions of microprocessor 36 and CPU 37 could be easily integrated into a single processor, as one skilled in the art will realize. Additionally, connector 41 need not be located on the card reader but may appear anywhere on the body of the vending machine 20. In the preferred "retrofitted" embodiment, a suitable card reader (containing a Motorola MC68HC11 microcontroller) is part no. A-745D (containing firmware version M-754D Rev. 3.36D, owned by the Detsky Group), manufactured by Access Control Technologies, Inc., 125 Weldon Pkwy., St. Louis Mo., 63043.

In operation, a customer follows the instruction on display 26 to first procure an authorization card from an issue station operator. Once procured, display 26 informs the user to insert or swipe the authorization card in or through card reader 32, or to enter the password or other relevant age-verification data into key pad 30. As discussed with reference to FIG. 2, the entered password data (either from the key pad or the card reader) is sent to microprocessor 36. The microprocessor 36 compares that data to data stored in the microprocessor to see if the data matches. After verification, the Type I/Type II determination is made, again using the microprocessor 36. If a Type II card is detected, the display 26 prompts the user to swipe, for example, his credit card through card reader 32. The microprocessor 36 then determines if the additional information on the Type II card (i.e., the customer's credit card number) matches the data on the swiped credit card. If so, the display prompts the user to enter payment via money-input device 28, the customer chooses a product for purchase via key pad 30, and retrieves the product from door 34 as is typical with a standard vending machine.

Figure 4:
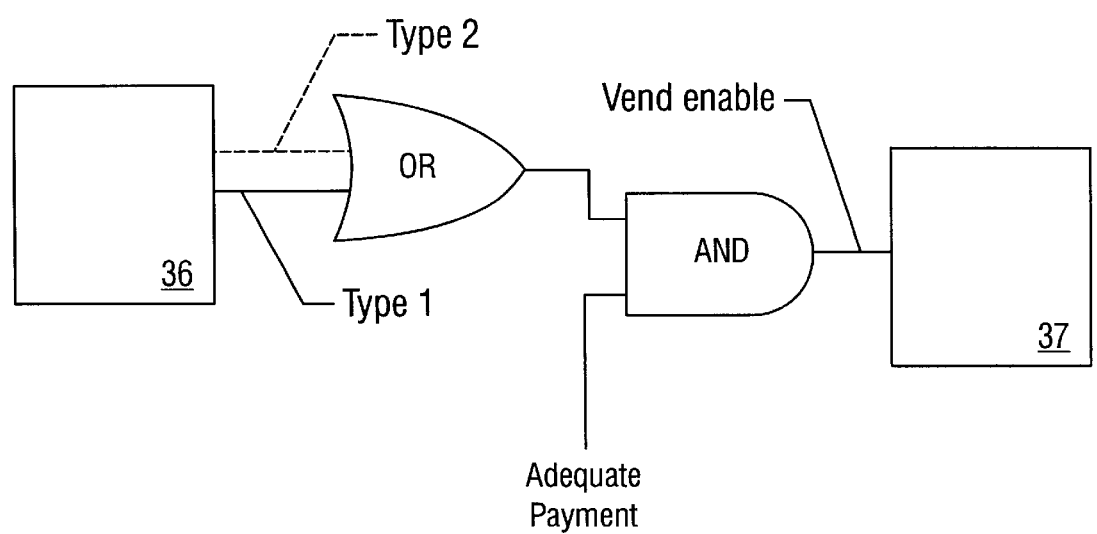
FIG. 4 is a logic diagram illustrating the circuitry for enabling the purchase of an age-restricted product from the vending machine of FIG. 3.

In the preferred "retrofitted" embodiment, microprocessor 36 works with CPU 37 to enable or disable the purchase. In the event that microprocessor 36 determines that a purchase is not appropriate, for example, because the password on the card does not match the password stored in microprocessor 36, because the credit card data does not match the additional information on the Type II card, or because the authorization card simply is not recognized by the system, the purchase will not be allowed, and the customer will not be prompted to enter money into the machine. This is accomplished by sending a control signal (or signals) to CPU 37, as shown in FIG. 4. In a traditional vending machine, a signal is sent to CPU 37 to indicate whether "adequate payment" has been provided by the customer to make a purchase. If so, CPU 37 enables the purchase through traditional means. As retrofitted, microprocessor 36 sends a "vend enable" signal to CPU 37 after verification of the password(s) is completed, which is analogous to the "adequate payment" signal in a traditional vending machine. As shown in FIG. 4, the "vend enable" signal is generated when "adequate payment" has been received, and when either a Type 1 or Type 2 card has been verified.

From the foregoing detailed description of specific embodiments of the invention, it should be apparent that an improved method and apparatus for vending age-restricted products has been disclosed. Although specific embodiments of the invention have been disclosed in some detail, this has been done solely for the purposes of illustrating various aspects and features of the invention, and is not intended to be limiting with respect to the scope of the invention. One skilled in the art will immediately recognize upon reading this disclosure that several other modifications could be made to the disclosed method and apparatus that are consistent with the inventive nature of the disclosed subject matter. It is therefore contemplated that various substitutions, alterations, and/or modifications may be made to the disclosed embodiment without departing from the spirit and scope of the invention as defined in the appended claims.

What is claimed is:

1. A method of vending an age-restricted product from a vending machine using an authorization card, comprising:

issuing an authorization card upon verification of a customer's age as suitable to purchase the age restricted products;

inputting a first password from the authorization card into the vending machine by inputting the authorization card into a card reader located on the vending machine, wherein the authorization card contains integrated circuits which contain the first password;

comparing the first password with a second password stored in the vending machine;

enabling the vending machine to vend the product if the first and second passwords match; and vending the product to the customer in response to the customer entering payment into the vending machine.

2. The method of claim 1, wherein the step of enabling the vending machine further includes enabling the vending machine to accept payment from the customer if the first and second passwords match.

3. The method of claim 1, wherein the authorization card includes first additional data, and further comprising the steps of:

inputting first additional data from the authorization card into the vending machine, wherein the first additional data corresponds to second additional data encoded on a second card;

inputting the second card into the vending machine;

comparing the first and second additional data; and enabling the vending machine to vend a product to the customer if the first and second additional data match.

4. The method of claim 3, wherein the second card is selected from the group consisting of the customer's credit card, debit card, and drivers license.

5. The method of claim 3, wherein the first or second additional data is selected from the group consisting of the customer's credit card number, debit card number, drivers license number, social security number, address, name, and phone number.

6. A method for allowing a customer to purchase a product from a vending machine system, comprising:

inputting an authorization card into the vending machine system;

determining first information stored on the authorization card;

determining whether the authorization card contains additional information requiring verification for the purchase; and if additional information is required for verification for the purchase, inputting a second card containing such additional information and allowing the purchase of the product if the additional information on the authorization card and additional information on the second card match.

7. The method of claim 6, wherein the authorization card is issued upon verification of the customer's age as suitable to purchase age-restricted products.

8. The method of claim 6, wherein the first information is a password.

9. The method of claim 6, wherein the step of allowing the purchase further includes enabling the vending machine to accept payment from the customer if the additional information on the authorization card and the additional information on the second card match.

10. The method of claim 6, wherein the first or additional information is selected from the group consisting of the customer's credit card number, debit card number, drivers license number, social security number, address, name, and phone number.

11. The method of claim 6, wherein the second card is selected from the group consisting of the customer's credit card, debit card, and drivers license.

12. The method of claim 8, wherein the authorization card has a magnetic strip containing the password.

13. The method of claim 8, wherein the authorization card contains integrated circuits which contain the password.

14. The method of claim 6, wherein the second card has a magnetic strip containing the additional information.

15. A method of vending an age-restricted product from a vending machine using an authorization card, comprising:

issuing a first authorization card upon verification of a customer's age as suitable to purchase the age restricted products;

inputting the first authorization card into the vending machine;

determining if the first authorization card requires further authentication; and if the first authorization card requires further authentication, providing the further authentication to the vending machine by inputting a second card into the vending machine and enabling the vending machine to vend the product after authentication of the second card.

16. The method of claim 15, wherein the step of enabling the vending machine further includes enabling the vending machine to accept payment from the customer.

17. The method of claim 15, wherein the step of inputting the first authorization card comprises inputting the first authorization card into a card reader located on the vending machine.

18. The method of claim 15, wherein the first information comprises a first password.

19. The method of claim 18, wherein the first password is stored on a magnetic strip or in integrated circuits on the first authorization card.

20. The method of claim 15, further comprising inputting a password on a key pad on the vending machine.

21. The method of claim 15, wherein the second card is selected from the group consisting of the customer's credit card, debit card, and drivers license.

22. The method of claim 15, wherein authentication of the second card comprises an analysis of data selected from the group consisting of the customer's credit card number, debit card number, drivers license number, social security number, address, name, and phone number.

* * * * *